United States Patent
Horiguchi et al.

(10) Patent No.: US 11,618,436 B2
(45) Date of Patent: Apr. 4, 2023

(54) CONTROLLING DRIVING FORCE DISTRIBUTION RATIO IN RESPONSE TO PREDICTION OF OVERSTEER

(71) Applicant: SUBARU CORPORATION, Tokyo (JP)

(72) Inventors: Harunobu Horiguchi, Tokyo (JP); Ryoichi Mizutani, Tokyo (JP); Akihisa Osada, Tokyo (JP); Yohei Kawashima, Tokyo (JP); Yuki Sugimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 406 days.

(21) Appl. No.: 17/060,353

(22) Filed: Oct. 1, 2020

(65) Prior Publication Data

US 2021/0139016 A1    May 13, 2021

(30) Foreign Application Priority Data

Nov. 12, 2019 (JP) .............................. JP2019-204397
Sep. 9, 2020 (JP) .............................. JP2020-151314

(51) Int. Cl.
*G05D 1/00* (2006.01)
*B60W 30/045* (2012.01)
(Continued)

(52) U.S. Cl.
CPC .......... *B60W 30/045* (2013.01); *B60W 10/10* (2013.01); *B60W 10/20* (2013.01);
(Continued)

(58) Field of Classification Search
CPC .... B60W 30/045; B60W 10/10; B60W 10/20; B60W 30/18145; B60W 40/08;
(Continued)

(56) References Cited

U.S. PATENT DOCUMENTS

| 2007/0088484 A1* | 4/2007 | Fujita | B60W 30/18145 |
| | | | 701/41 |
| 2014/0303827 A1* | 10/2014 | Dolgov | B60W 60/0053 |
| | | | 701/23 |

(Continued)

FOREIGN PATENT DOCUMENTS

| JP | 2770670 B2 * | 9/1998 |
| JP | 2006240400 A * | 9/2006 |

(Continued)

*Primary Examiner* — Donald J Wallace
*Assistant Examiner* — Daniel M. Robert
(74) *Attorney, Agent, or Firm* — McDermott Will & Emery LLP (57) ABSTRACT

A vehicle control apparatus includes a steering device, a steering controller, a steering input member, a front-rear driving force distribution unit, and a behavior controller. The steering device steers front wheels of a vehicle. The steering controller controls and causes the steering device to perform steering automatically. The steering input member receives a steering operation inputted by a driver. The front-rear driving force distribution unit changes a front-rear driving force distribution ratio. The behavior controller predicts, if a steering operation is performed via the steering input member during the automatic steering, a behavior of the vehicle to be exhibited after steering corresponding to the steering operation, and causes, if an oversteer behavior is predicted to occur, the front-rear driving force distribution unit to change the driving force distribution ratio to a front-wheel biased distribution ratio as compared with a case where the oversteer behavior is not predicted to occur.

6 Claims, 8 Drawing Sheets

(51) Int. Cl.
  *B60W 10/20*  (2006.01)
  *B60W 10/10*  (2012.01)
  *B60W 40/08*  (2012.01)
  *B60W 30/18*  (2012.01)
  *B60W 50/00*  (2006.01)
  *B60W 50/08*  (2020.01)

(52) U.S. Cl.
  CPC ...... *B60W 30/18145* (2013.01); *B60W 40/08* (2013.01); *B60W 50/0097* (2013.01); *B60W 50/087* (2013.01); *B60W 2540/00* (2013.01); *G05D 1/0061* (2013.01)

(58) Field of Classification Search
  CPC .......... B60W 50/0097; B60W 50/087; B60W 2540/00; B60W 2540/18; B60W 2720/403; B60W 2720/406; B60W 10/184; B60W 10/14; B60W 50/08; B60W 2050/0072; G05D 1/0061
  See application file for complete search history.

(56) References Cited

U.S. PATENT DOCUMENTS

| | | | |
|---|---|---|---|
| 2017/0305416 A1* | 10/2017 | Yamakado | ................ B60T 7/12 |
| 2019/0086917 A1* | 3/2019 | Okimoto | .............. G05D 1/0061 |
| 2019/0286127 A1* | 9/2019 | Watanabe | ............ G05D 1/0061 |
| 2019/0300013 A1* | 10/2019 | Shiraishi | ........... B60W 60/0053 |
| 2020/0001891 A1* | 1/2020 | Takano | ................. B60W 10/20 |
| 2020/0089180 A1* | 3/2020 | Kanekawa | ............... G05B 9/02 |
| 2020/0089225 A1* | 3/2020 | Sadakiyo | ............. G05D 1/0088 |
| 2020/0159212 A1* | 5/2020 | Kuwabara | ......... B60W 60/0053 |
| 2020/0180678 A1 | 6/2020 | Watanabe et al. | |
| 2020/0310419 A1* | 10/2020 | Sato | ..................... G05D 1/0066 |

FOREIGN PATENT DOCUMENTS

| | | | |
|---|---|---|---|
| JP | 2018-020586 A | | 2/2018 |
| KR | 20180067121 | * | 6/2018 |

\* cited by examiner

CONTROLLING DRIVING FORCE DISTRIBUTION RATIO IN RESPONSE TO PREDICTION OF OVERSTEER

CROSS-REFERENCE TO RELATED APPLICATIONS

The present application claims priority from Japanese Patent Application No. 2019-204397 filed on Nov. 12, 2019 and Japanese Patent Application No. 2020-151314 filed on Sep. 9, 2020, the entire contents of which are hereby incorporated by reference.

BACKGROUND

The technology relates to a vehicle control apparatus that controls steering and driving force distribution of a vehicle.

A vehicle such as a four-wheeled automobile is controlled by giving a steering angle to front wheels on the basis of an amount of operation of a steering wheel, for example, that receives a steering operation inputted by a driver, and generating a slip angle and cornering force for tires.

In recent years, driver assistance control, such as lane keeping assistance control, and automated driving control that causes a vehicle to autonomously travel have been widely used. In such control, a target travel path is set by recognizing an environment around the own vehicle (e.g., a road shape or an obstacle), and steering is performed automatically to cause the vehicle to trace the target travel path.

SUMMARY

An aspect of the technology provides a vehicle control apparatus including a steering device, a steering controller, a steering input member, a front-rear driving force distribution unit, and a behavior controller. The steering device includes an actuator and is configured to steer front wheels of a vehicle. The steering controller is configured to control the steering device and cause the steering device to perform steering automatically, on the basis of a target travel path of the vehicle. The steering input member is configured to receive a steering operation inputted by a driver. The front-rear driving force distribution unit is configured to change a front-rear driving force distribution ratio that is a distribution ratio between driving force to be transmitted to a road surface from the front wheels of the vehicle and driving force to be transmitted to the road surface from rear wheels of the vehicle. The behavior controller is configured to predict, in a case where a steering operation is performed via the steering input member while the steering controller is causing the steering to be performed automatically, a behavior of the vehicle to be exhibited after steering corresponding to the steering operation, and to cause, in a case where an oversteer behavior of a predetermined magnitude or more is predicted to occur, the front-rear driving force distribution unit to change the front-rear driving force distribution ratio to a front-wheel biased distribution ratio as compared with a case where the oversteer behavior is not predicted to occur.

An aspect of the technology provides a vehicle control apparatus including a steering device, a steering controller, a steering input member, a left-right driving force distribution unit, and a behavior controller. The steering device includes an actuator and is configured to steer front wheels of a vehicle. The steering controller is configured to control the steering device and cause the steering device to perform steering automatically, on the basis of a target travel path of the vehicle. The steering input member is configured to receive a steering operation inputted by a driver. The left-right driving force distribution unit is configured to change a left-right driving force distribution ratio that is a distribution ratio between driving force to be transmitted to a road surface from a left front wheel of the front wheels of the vehicle and driving force to be transmitted to the road surface from a right front wheel of the front wheels of the vehicle or a distribution ratio between driving force to be transmitted to the road surface from a left rear wheel of the vehicle and driving force to be transmitted to the road surface from a right rear wheel of the vehicle. The behavior controller is configured to predict, in a case where a steering operation is performed via the steering input member while the steering controller is causing the steering to be performed automatically, a behavior of the vehicle to be exhibited after steering corresponding to the steering operation, and to cause, in a case where an oversteer behavior of a predetermined magnitude or more is predicted to occur, the left-right driving force distribution unit to change the left-right driving force distribution ratio to a turning-inner-wheel biased distribution ratio as compared with a case where the oversteer behavior is not predicted to occur.

An aspect of the technology provides a vehicle control apparatus including a steering device, a steering controller, a steering input member, a front-rear driving force distribution unit, and a behavior controller. The steering device includes an actuator and is configured to steer front wheels of a vehicle. The steering controller is configured to control the steering device and cause the steering device to perform steering automatically, on the basis of a target travel path of the vehicle. The steering input member is configured to receive a steering operation inputted by a driver. The front-rear driving force distribution unit is configured to change a front-rear driving force distribution ratio that is a distribution ratio between driving force to be transmitted to a road surface from the front wheels of the vehicle and driving force to be transmitted to the road surface from rear wheels of the vehicle. The behavior controller is configured to predict, in a case where a steering operation is performed via the steering input member while the steering controller is causing the steering to be performed automatically, a behavior of the vehicle to be exhibited after steering corresponding to the steering operation, and to cause, in a case where an understeer behavior of a predetermined magnitude or more is predicted to occur, the front-rear driving force distribution unit to change the front-rear driving force distribution ratio to a rear-wheel biased distribution ratio as compared with a case where the understeer behavior is not predicted to occur.

An aspect of the technology provides a vehicle control apparatus including a steering device, a steering controller, a steering input member, a left-right driving force distribution unit, and a behavior controller. The steering device includes an actuator and is configured to steer front wheels of a vehicle. The steering controller is configured to control the steering device and cause the steering device to perform steering automatically, on the basis of a target travel path of the vehicle. The steering input member is configured to receive a steering operation inputted by a driver. The left-right driving force distribution unit is configured to change a left-right driving force distribution ratio that is a distribution ratio between driving force to be transmitted to a road surface from a left front wheel of the front wheels of the vehicle and driving force to be transmitted to the road surface from a right front wheel of the front wheels of the vehicle or a distribution ratio between driving force to be transmitted to the road surface from a left rear wheel of the vehicle and driving force to be transmitted to the road surface from a right rear wheel of the vehicle. The behavior controller is configured to predict, in a case where a steering operation is performed via the steering input member while the steering controller is causing the steering to be performed automatically, a behavior of the vehicle to be exhibited after steering corresponding to the steering operation, and to cause, in a case where an understeer behavior of a predetermined magnitude or more is predicted to occur, the left-right driving force distribution unit to change the left-right driving force distribution ratio to a turning-outer-wheel biased distribution ratio as compared with a case where the understeer behavior is not predicted to occur.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

COMPARATIVE EXAMPLE

Vehicles that perform driver assistance control or automated driving control include a vehicle configured to accept an override steering operation performed by a driver even during automatic steering control, for sudden obstacle avoidance, for example, thereby allowing the driver to optionally modify a travel path. An override refers to intervention of a manual operation in automatic control.

As an example of an existing technique related to control performed when a driver performs an override steering operation in a vehicle that performs steering control, Japanese Unexamined Patent Application Publication (JP-A) No. 2018-20586 discloses a steering support device that calculates an assist control amount of a steering angle on the basis of information regarding a road shape, for example, acquired beforehand, and executes steering control on the basis of the assist control amount.

JP-A No. 2018-20586 assumes a case where a driver intends to respond to a situation that is not taken into account in the calculation of the assist control amount, such as when the driver abruptly performs a steering operation for obstacle avoidance for example. JP-A No. 2018-20586 describes that, in such a case, to prevent the steering operation performed by the driver from being hindered by the steering control, the assist control amount in case where a steering direction based on the control and a steering direction inputted via a steering wheel are opposite is adjusted to be smaller than that in case where these directions are the same.

In a case where automatic steering based on steering control is ongoing during automated driving, for example, a driver may operate a steering wheel, for example, to perform an override steering operation. In such a case, the steering operation can cause a vehicle to exhibit an unstable behavior such as oversteer or understeer.

In view of this concern, in a case where the automatic steering is ongoing, in one example, manual steering may be suppressed by making a steering gear ratio slow, for example. In another example, an override steering operation may be prohibited, i.e., steering beyond a designated steering angle based on automatic steering control may be prevented. However, in such cases, the inputted operation is not reflected in an actual steering angle (a toe angle of wheels). This can cause the driver to feel discomfort.

It is desirable to provide a vehicle control apparatus that makes it possible to stabilize a vehicle behavior exhibited when a driver performs an override steering operation during automatic steering control, and reduce discomfort to be felt by the driver.

First Example Embodiment

Hereinafter, description will be given on a vehicle control apparatus according to a first example embodiment of the technology.

The vehicle control apparatus according to the first example embodiment may be provided in, for example, an automobile such as a four-wheeled passenger car that is all-wheel driven (AWD) and uses front wheels as wheels to be steered.

Figure 1:
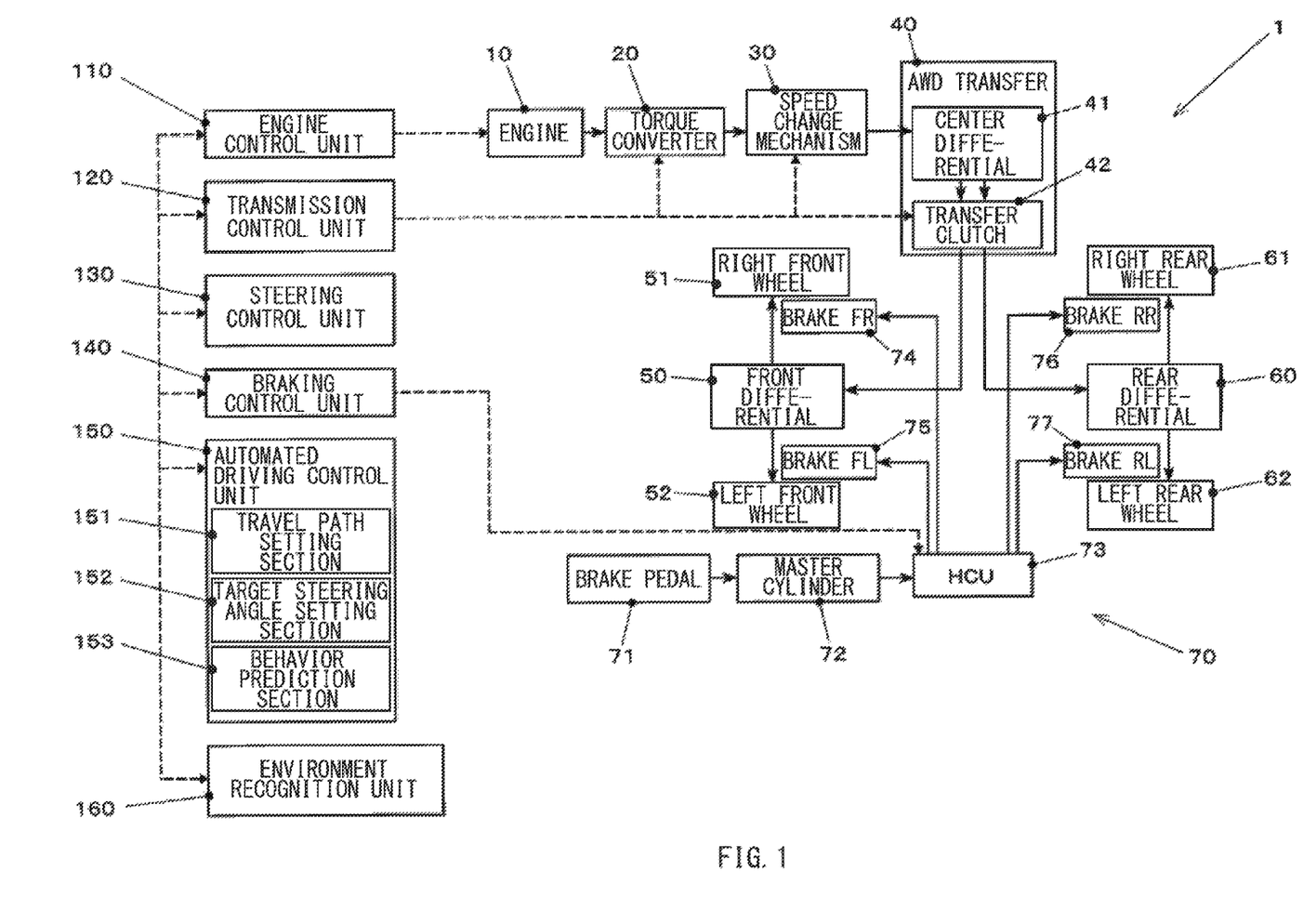
FIG. 1 is a diagram schematically illustrating a configuration of a vehicle including a vehicle control apparatus according to one example embodiment of the technology.

FIG. 1 schematically illustrates a configuration of a vehicle including the vehicle control apparatus according to the first example embodiment.

As illustrated in FIG. 1, a vehicle 1 may include an engine 10, a torque converter 20, a speed change mechanism 30, an AWD transfer 40, a front differential 50, and a rear differential 60, for example.

The engine 10 may be a power source for traveling of the vehicle 1. The engine 10 may be an internal combustion engine, such as a gasoline engine.

The torque converter 20 may be a fluid coupling that transmits an output of the engine 10 to the speed change mechanism 30. The torque converter 20 may serve as a starting device that enables the vehicle 1 to start from zero speed.

The torque converter 20 may include a lockup clutch that directly couples the input side and the output side to each other.

The speed change mechanism 30 may be, for example, a continuously variable transmission (CVT) or a step automatic transmission (AT). The CVT may include a pair of variable pulleys and a variator including a chain or a belt, for example. The step AT may include a plurality of planetary gear sets. The speed change mechanism 30 may be configured to speed-up or speed-down the output of the engine 10 inputted from the torque converter 20. The speed change mechanism 30 may cooperate with the torque converter 20 to configure a transmission.

The AWD transfer 40 may be a driving force transmitting device that distributes and transmits, to the front differential 50 and the rear differential 60, driving force inputted from the speed change mechanism 30.

The AWD transfer 40 may include a center differential 41 and a transfer clutch 42, for example.

The center differential 41 may include, for example, a complex planetary gear set. The center differential 41 may be a driving force distribution mechanism that distributes torque to the front differential 50 and the rear differential 60 to achieve a torque distribution ratio of about 35:65, for example. The center differential 41 may also serve as a differential mechanism that absorbs rotational speed difference of the front differential 50 and the rear differential 60.

The transfer clutch 42 may be a differential limiting mechanism that restrains a differential between outputs for the front wheels and the rear wheels of the center differential 41. The transfer clutch 42 may include, for example, a multiplate wet clutch that is driven by oil pressure or electromagnetic force. Engagement force or clutch crimping force, i.e., differential limiting torque, of the transfer clutch 42 may be controlled by a transmission control unit 120 to be described later.

Adjusting the engagement force of the transfer clutch 42 enables the AWD transfer 40 to steplessly adjust a driving force distribution ratio between the front wheels and the rear wheels, from 35:65 (the most rear-wheel biased state) up to 50:50 (the most front-wheel biased state), for example.

In normal time (during non-intervention of oversteer suppression control or understeer suppression control to be described later), the driving force distribution ratio between the front wheels and the rear wheels may be corrected by the transmission control unit 120, depending on a state of the vehicle 1, such as acceleration, climbing, or turning. A basic value of the driving force distribution ratio between the front wheels and the rear wheels may be, for example, an intermediate value (e.g., 45:55) between the above distribution ratios.

In one embodiment, the AWD transfer 40 may serve as a "front-rear driving force distribution unit".

The front differential 50 may be configured to transmit, to a right front wheel 51 and a left front wheel 52, driving force for the front wheels transmitted from the AWD transfer 40, as well as performing final reduction. The front differential 50 may also serve as a differential mechanism that absorbs rotational speed difference of the right front wheel 51 and the left front wheel 52.

The rear differential 60 may be configured to transmit, to a right rear wheel 61 and a left rear wheel 62, driving force for the rear wheels transmitted from the AWD transfer 40, as well as performing final reduction. The rear differential 60 may also serve as a differential mechanism that absorbs rotational speed difference of the right rear wheel 61 and the left rear wheel 62.

The vehicle 1 may also include a brake device 70 that serves as a braking device.

The brake device 70 may include a brake pedal 71, a master cylinder 72, a hydraulic control unit (HCU) 73, a brake FR 74, a brake FL 75, a brake RR 76, and a brake RL 77, for example.

The brake pedal 71 may be an input unit that receives a brake operation inputted by a driver.

The master cylinder 72 may be coupled to the brake pedal 71, and configured to apply pressure to a brake fluid in response to an operation of depressing the brake pedal 71. The master cylinder 72 may be provided with a vacuum servo unit that amplifies input from the brake pedal 71 by using intake manifold negative pressure of the engine 10.

The hydraulic control unit 73 may be configured to, for anti-lock brake control, yaw control, or automatic brake control, for example, individually increase or decrease hydraulic pressure of the brake fluid to be supplied to wheel cylinders of the respective wheels.

The hydraulic control unit 73 may include an electric pump that applies pressure to the brake fluid, and a control valve, for example, that individually adjusts the hydraulic pressure in the wheel cylinders.

The brake FR 74, the brake FL 75, the brake RR 76, and the brake RL 77 may be provided respectively for the right front wheel 51, the left front wheel 52, the right rear wheel 61, and the left rear wheel 62. Each of the brakes may include a disc-shaped rotor that rotates with the wheel, and a caliper, for example, that presses a pad against the rotor. The caliper may include the wheel cylinder that presses the pad under the hydraulic pressure of the brake fluid supplied from the hydraulic control unit 73.

The vehicle 1 may include an engine control unit 110, the transmission control unit 120, a steering control unit 130, a braking control unit 140, an automated driving control unit 150, and an environment recognition unit 160, for example.

The engine control unit 110, the transmission control unit 120, the steering control unit 130, the braking control unit 140, the automated driving control unit 150, and the environment recognition unit 160 may each include an information processor such as a central processing unit (CPU), a storage including a random access memory (RAM) and a read only memory (ROM), an input-output interface, and a bus, for example. The bus may couple the information processor, the storage, and the input-output interface, for example.

The engine control unit 110, the transmission control unit 120, the steering control unit 130, the braking control unit 140, the automated driving control unit 150, and the environment recognition unit 160 may be coupled to each other directly or indirectly via an on-board local area network (LAN) device such as a controller area network (CAN) communication system. It is thus possible to perform communications with each other.

The engine control unit 110 may be configured to comprehensively control the engine 10 and its auxiliaries.

The engine control unit 110 may be configured to adjust the output of the engine 10.

The transmission control unit 120 may be configured to control speed change in the speed change mechanism 30, forward/reverse switching, and engagement force (restraint force) of the lockup clutch in the torque converter 20, for example.

The transmission control unit 120 may also be configured to control the driving force distribution ratio between the front wheels and the rear wheels, by changing the engagement force of the transfer clutch 42 of the AWD transfer 40.

The steering control unit 130 may be configured to comprehensively control a steer-by-wire steering device 200 to be described later, to control a steering angle of the vehicle 1.

The steering control unit 130 will be described in detail later.

The braking control unit 140 may be configured to control the hydraulic control unit 73 to individually control the hydraulic pressure in the wheel cylinders of the brake FR 74, the brake FL 75, the brake RR 76, and the brake RL 77. The hydraulic pressure in the wheel cylinder may be in correlation with braking force.

The braking control unit 140 may be configured to perform, for example, anti-lock brake control and behavior control. The anti-lock brake control may refer to, upon occurrence of wheel lock due to braking, periodically reducing the hydraulic pressure in the wheel cylinder of the wheel to recover rotation. The behavior control may refer to, upon occurrence of an oversteer behavior or an understeer behavior, generating a braking force difference between the left and right wheels to generate yaw moment in a direction of suppressing the behavior.

To perform such control, the braking control unit 140 may be coupled to speed sensors that individually detect rotation speed of the wheels, a yaw rate sensor that detects a yaw rate of a body of the vehicle 1, and an acceleration sensor that detects a lateral acceleration of the body, for example.

The automated driving control unit 150 may be configured to perform automated driving control of giving instructions to the engine control unit 110, the transmission control unit 120, the steering control unit 130, and the braking control unit 140, for example, to enable the vehicle 1 to travel automatically and autonomously.

The automated driving control unit 150 may include a travel path setting section 151, a target steering angle setting section 152, and a behavior prediction section 153, for example.

The travel path setting section 151 may be configured to generate an automated driving scenario including a target travel path and a target speed history, for example, of the own vehicle, on the basis of information provided from the environment recognition unit 160.

During execution of the automated driving control, the target steering angle setting section 152 may sequentially calculate a target steering angle for the own vehicle to trace the target travel path, on the basis of information such as a relative position of the own vehicle with respect to the target travel path, a speed of the own vehicle, or an estimated coefficient of friction of a road surface. The target steering angle setting section 152 may instruct the steering control unit 130 on the target steering angle.

The target steering angle may be controlled by being sequentially fed back, in response to deviation of the own vehicle from the target travel path, for example.

In one embodiment, the target steering angle setting section 152 may cooperate with the steering control unit 130 to serve as a "steering controller".

The behavior prediction section 153 may be configured to predict a behavior that can occur in the vehicle 1 during execution of the automated driving control.

The automated driving control unit 150 is configured to, when the driver manually performs an override steering operation during the automated driving control, predict the behavior of the vehicle 1 after the override. In a case where the oversteer behavior or the understeer behavior is predicted to occur, the automated driving control unit 150 causes a distribution ratio of driving force to be changed. In one embodiment, the automated driving control unit 150 may serve as a "behavior controller".

The environment recognition unit 160 may be configured to recognize an environment around the own vehicle by using various sensors, and provide information regarding a lane shape or an obstacle, for example, to the automated driving control unit 150.

The environment recognition unit 160 may be coupled to, for example, various sensors such as a stereo camera, a millimeter-wave radar, or a 3D laser scanner (LIDAR), or a navigation device including 3D high-precision map data and a positioning unit such as a GPS.

Figure 2:
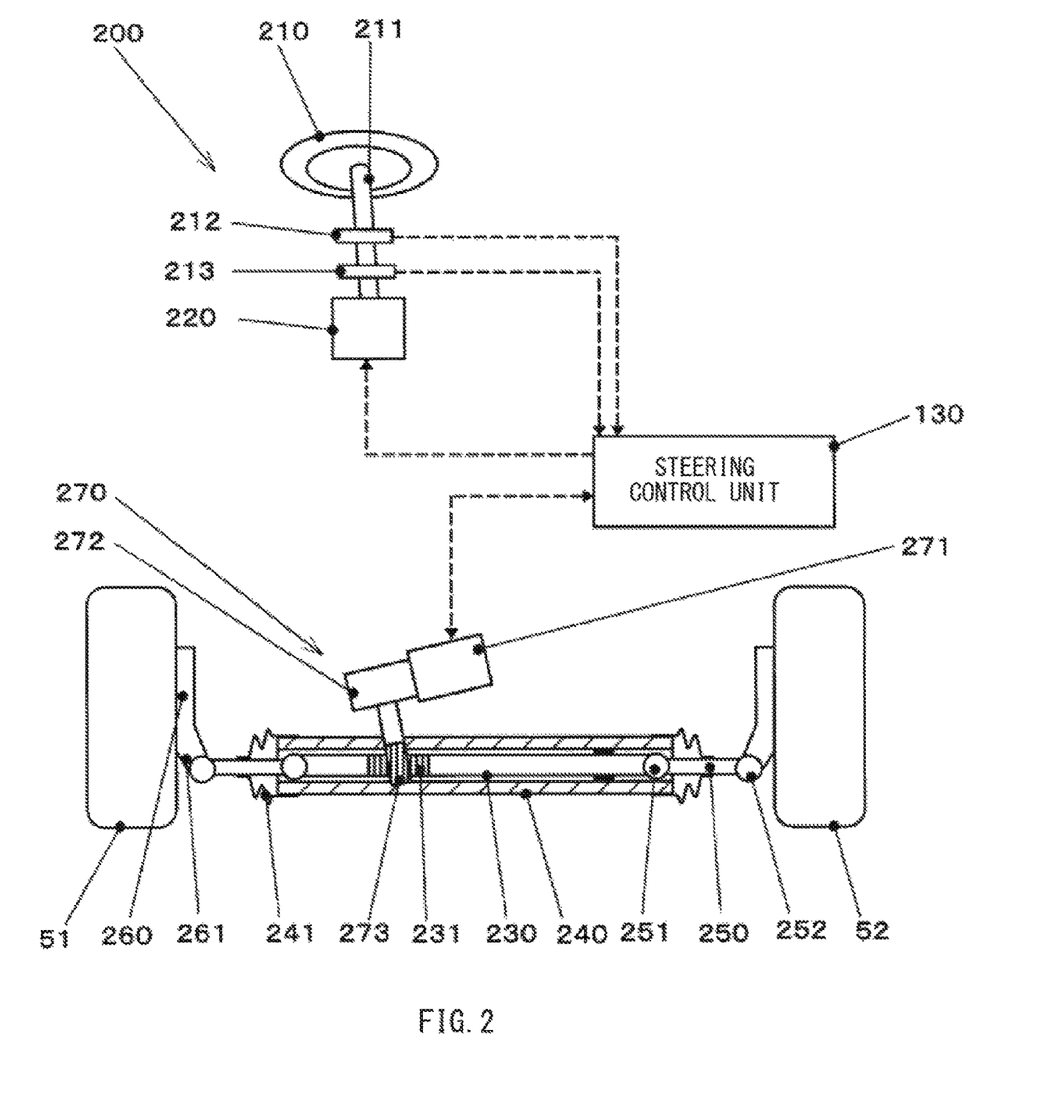
FIG. 2 is a diagram schematically illustrating a configuration of a steering device of the vehicle including the vehicle control apparatus according to one example embodiment.

FIG. 2 schematically illustrates a configuration of the steering device 200 of the vehicle 1.

The vehicle 1 may include the steering device 200, which will now be described, to steer the right front wheel 51 and the left front wheel 52 serving as wheels to be steered.

The steering device 200 may be an electric steer-by-wire steering device including a steering wheel 210, a reaction force generator 220, a rack shaft 230, a rack housing 240, a tie rod 250, a housing 260, and an actuator unit 270, for example. In one embodiment, the actuator unit 270 may serve as an "actuator".

The steering wheel 210 may be a ring-shaped operating member that receives a steering operation inputted by the driver by rotating the steering wheel 210. In one embodiment, the steering wheel 210 may serve as a "steering input member".

The steering wheel 210 may be disposed in a vehicle compartment of the vehicle 1 to be opposed to a driver's seat.

The steering wheel 210 may be provided with a steering shaft 211, a steering angle sensor 212, and a torque sensor 213.

The steering shaft 211 may be a rotary shaft having one end attached to the steering wheel 210.

The steering angle sensor 212 may be provided at a midway part of the steering shaft 211. The steering angle sensor 212 may be a steering operation amount detector that detects a rotation angular position of the steering shaft 211.

The torque sensor 213 may be provided at a midway part of the steering shaft 211. The torque sensor 213 may be closer to the reaction force generator 220 than the steering angle sensor 212 is. The torque sensor 213 may be configured to detect torque (operating force or maintaining force applied to the steering wheel 210 by the driver) applied to the steering shaft 211.

Outputs of the steering angle sensor 212 and the torque sensor 213 may be transmitted to the steering control unit 130.

The steering control unit 130 may control an output of a motor 271 of the actuator unit 270, on the basis of the outputs of the steering angle sensor 212 and the torque sensor 213.

The reaction force generator 220 may include an actuator that gives torque to the steering shaft 211 in response to an instruction from the steering control unit 130, to generate pseudo self-aligning torque.

An output shaft of the reaction force generator 220 may be coupled to an end of the steering shaft 211 on the side opposite to the steering wheel 210 side.

The rack shaft 230 may be a columnar member disposed with its longitudinal direction (axial direction) extending along a vehicle width direction.

The rack shaft 230 may be supported to be able to move translationally in the vehicle width direction with respect to the body.

A portion of the rack shaft 230 may be provided with a rack gear 231 that engages with a pinion gear of a pinion shaft 273.

In response to rotation of the steering shaft 211, the rack gear 231 may be driven by the pinion gear, causing the rack shaft 230 to move translationally (rectilinearly) along the vehicle width direction.

The rack housing 240 may be a substantially cylindrical member that accommodates and supports the rack shaft 230, allowing relative displacement of the rack shaft 230 along the vehicle width direction.

The rack housing 240 may cooperate with the rack shaft 230 and the pinion shaft 273, for example, to configure a steering gear box.

A rack boot 241 may be provided at each end of the rack housing 240.

The rack boot 241 may be a member that prevents entry of a foreign matter, such as dust, into the rack housing 240, while allowing relative displacement of the tie rod 250 with respect to the rack housing 240.

The rack boot 241 may include a resin-based material, such as an elastomer, and have flexibility. The rack boot 241 may have a cylindrical bellows shape.

The tie rod 250 may be a shaft-shaped interlocking member that couples an end of the rack shaft 230 and a knuckle arm 261 of the housing 260 to each other, and causes the housing 260 to pivot about a kingpin axis in synchronization with the translational movement of the rack shaft 230.

An end of the tie rod 250 on the inside in the vehicle width direction may be swingably coupled to the end of the rack shaft 230 via a ball joint 251.

An end of the tie rod 250 on the outside in the vehicle width direction may be coupled to the knuckle arm 261 of the housing 260 via a ball joint 252.

A turnbuckle mechanism (not illustrated) for toe-in adjustment may be provided at a connection between the tie rod 250 and the ball joint 252.

The housing (knuckle) 260 may be a member that accommodates a hub bearing. The hub bearing may support, rotatably about an axle, a hub to which each of the right front wheel 51 and the left front wheel 52 is attached.

The housing 260 may have the knuckle arm 261 provided to project frontward with respect to the axle.

The housing 260 may be supported to be pivotable about the kingpin axis serving as a predetermined rotational center axis.

In a case where a front suspension of the vehicle 1 is a MacPherson strut front suspension, for example, the kingpin axis may be a virtual axis connecting the center of a bearing of a strut top mount and the center of a ball joint. The ball joint may couple a lower part of the housing 260 and a lower arm to each other.

The housing 260 may be pushed or pulled in the vehicle width direction by the rack shaft 230 via the tie rod 250 to pivot about the kingpin axis, thereby turning each of the right front wheel 51 and the left front wheel 52.

The actuator unit 270 may be a drive that rotationally drives the pinion shaft 273 to generate rack thrust, thereby performing steering.

The actuator unit 270 may include the motor 271, a gear box 272, and the pinion shaft 273, for example.

The motor 271 may be an electric actuator that generates driving force to be given to the pinion shaft 273.

A rotation direction and output torque of the motor 271 may be controlled by the steering control unit 130.

An output shaft angular position (rotational angle) of the motor 271 may be configured to be fed back to the steering control unit 130.

The gear box 272 may include a speed reducing gear train that speeds-down a rotational output of the motor 271 (torque amplification) and transmits the resulting torque to the pinion shaft 273.

The pinion shaft 273 may be a rotary shaft to be rotationally driven by the motor 271 via the gear box 272.

A tip of the pinion shaft 273 may be provided with the pinion gear that engages with the rack gear 231 of the rack shaft 230 to drive the rack shaft 230.

Now, operation of the vehicle control apparatus according to the first example embodiment will be described.

Figure 3:
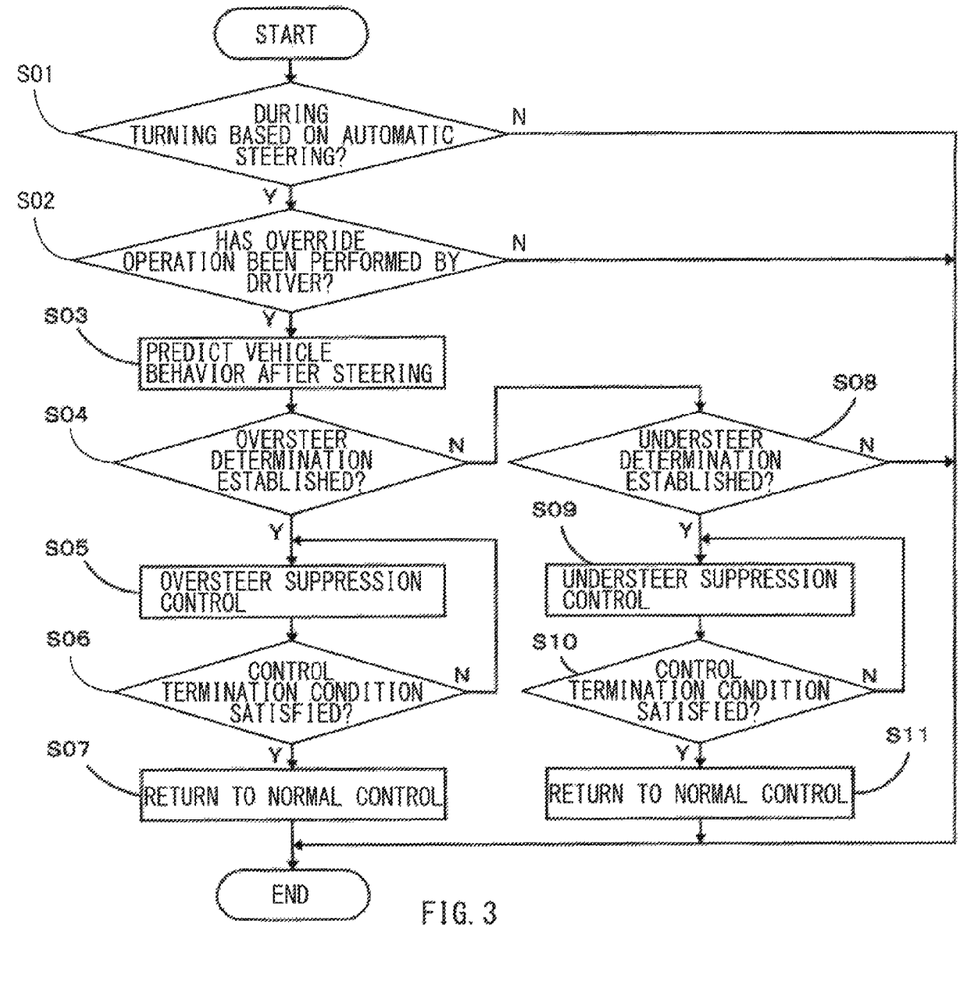
FIG. 3 is a flowchart illustrating control performed during automatic steering in the vehicle control apparatus according to one example embodiment.

FIG. 3 is a flowchart illustrating control performed during automatic steering in the vehicle control apparatus according to the first example embodiment.

Steps of the flowchart will be described below in order.

[Step S01: Automated Driving and Turning Determination]

The automated driving control unit 150 may determine whether the vehicle 1 is currently performing the automated driving control of performing steering autonomously, and is currently turning.

Whether the vehicle 1 is turning may be determined on the basis of, for example, a shape of the target travel path set by the travel path setting section 151, or the steering angle, the yaw rate, or the lateral acceleration of the vehicle 1.

In a case where the vehicle 1 is in a turning state under the automated driving control, i.e., automatic steering (step S01: Y), the process may be caused to proceed to step S02. In other cases (step S01: N), the series of processes may be brought to the end or may be caused to return.

[Step S02: Driver Override Presence/Absence Determination]

The automated driving control unit 150 may communicate with the steering control unit 130, and determine whether an override steering operation has been performed by the driver via the steering wheel 210. The override steering operation may be a steering operation performed to overlap steering control based on automated driving.

In a case where the override steering operation has been performed (step S02: Y), the process may be caused to proceed to step S03. In other cases (step S02: N), the series of processes may be brought to the end.

[Step S03: Vehicle Behavior Prediction After Steering]

The behavior prediction section 153 of the automated driving control unit 150 may predict, in a state of driving force distribution in the normal time, a vehicle behavior to be exhibited in a case where the front wheels are steered in response to the override steering operation detected in step S02. Hereinafter, the normal time may refer to during non-intervention of the oversteer suppression control or the understeer suppression control. For example, the normal time may refer to a case where the oversteer behavior or the understeer behavior of a predetermined magnitude or more is not predicted.

The vehicle behavior may be predicted by, for example, inputting parameters, including the current speed, steering angle, yaw rate, lateral acceleration, and estimated coefficient of friction of the road surface, to a numerical analysis model of the vehicle 1 prepared in advance.

Thereafter, the process may be caused to proceed to step S04.

[Step S04: Oversteer Determination]

In a case where an absolute value of the yaw rate (predicted yaw rate) in the vehicle behavior predicted in step S03 is equal to or greater than a predetermined oversteer suppression control intervention threshold (step S04: Y), the automated driving control unit 150 may assume that the override steering operation is likely to cause the vehicle 1 to exhibit the oversteer behavior of a predetermined magnitude or more. The process may thus be caused to proceed to step S05. In other cases (step S04: N), the process may be caused to proceed to step S08.

[Step S05: Oversteer Suppression Control]

The automated driving control unit 150 may perform the oversteer suppression control of instructing the transmission control unit 120 to increase the engagement force of the transfer clutch 42 of the AWD transfer 40 as compared with the normal time.

This control makes the driving force distribution between the front and rear wheels front-wheel biased as compared with the normal time. This strengthens an understeer tendency of the vehicle 1, and suppresses actual occurrence of the oversteer behavior in the vehicle 1. In the example embodiment, front-wheel biased may indicate a tendency of the front-rear driving force distribution approaching 50:50.

Thereafter, the process may be caused to proceed to step S06.

[Step S06: Oversteer Suppression Control Termination Determination]

In a case where the most recently detected yaw rate is equal to or less than a predetermined oversteer suppression control termination threshold (step S06: Y), the automated driving control unit 150 may assume that the oversteer behavior of a predetermined magnitude or more is unlikely to occur even if the oversteer suppression control is terminated. The process may thus be caused to proceed to step S07. In other cases (step S06: N), the process may be caused to return to step S05, and the subsequent processes may be repeated.

The oversteer suppression control termination threshold may be set smaller than the oversteer suppression control intervention threshold to prevent hunting of the control by imparting hysteresis characteristics.

[Step S07: Return to Normal Control]

The automated driving control unit 150 may instruct the transmission control unit 120 to reduce the engagement force of the transfer clutch 42 to engagement force in the normal time.

Thereafter, the series of processes may be brought to the end.

[Step S08: Understeer Determination]

In a case where the absolute value of the predicted yaw rate is equal to or less than a predetermined understeer suppression control intervention threshold (step S08: Y), the automated driving control unit 150 may assume that the override steering operation is likely to cause the vehicle 1 to exhibit the understeer behavior of a predetermined magnitude or more. The process may thus be caused to proceed to step S09. In other cases (step S08: N), the series of processes may be brought to the end.

[Step S09: Understeer Suppression Control]

The automated driving control unit 150 may perform the understeer suppression control of instructing the transmission control unit 120 to reduce the engagement force of the transfer clutch 42 of the AWD transfer 40 as compared with the normal time.

This control makes the driving force distribution between the front and rear wheels rear-wheel biased as compared with the normal time. This suppresses the understeer tendency of the vehicle 1, and suppresses actual occurrence of the understeer behavior in the vehicle 1. In the example embodiment, rear-wheel biased may indicate a tendency of the front-rear driving force distribution approaching 35:65.

Thereafter, the process may be caused to proceed to step S10.

[Step S10: Understeer Suppression Control Termination Determination]

In a case where the most recently detected yaw rate is equal to or less than a predetermined understeer suppression control termination threshold (step S10: Y), the automated driving control unit 150 may assume that the understeer behavior of a predetermined magnitude or more is unlikely to occur even if the understeer suppression control is terminated. The process may thus be caused to proceed to step S11. In other cases (step S10: N), the process may be caused to return to step S09, and the subsequent processes may be repeated.

The understeer suppression control termination threshold may be set larger than the understeer suppression control intervention threshold to prevent hunting of the control by imparting hysteresis characteristics.

[Step S11: Return to Normal Control]

The automated driving control unit 150 may instruct the transmission control unit 120 to increase the engagement force of the transfer clutch 42 to engagement force in the normal time.

Thereafter, the series of processes may be brought to the end.

Figure 4:
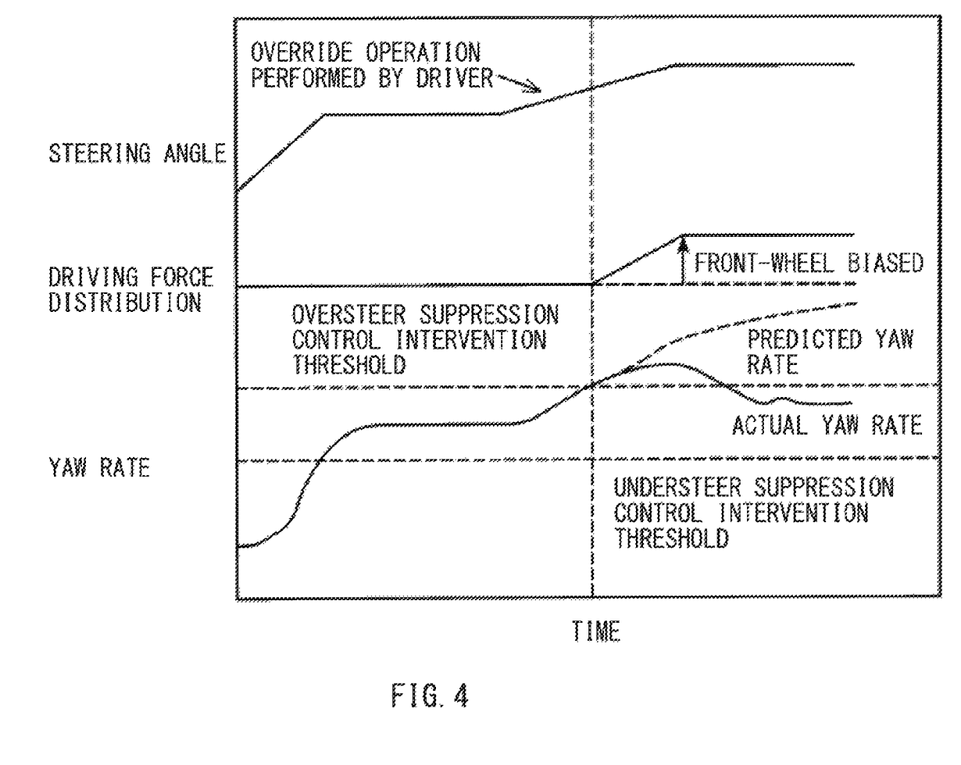
FIG. 4 is a diagram illustrating an example of progression of a steering angle, a yaw rate, and a front-rear driving force distribution ratio in the vehicle including the vehicle control apparatus according to one example embodiment.

FIG. 4 illustrates an example of progression of the steering angle, the yaw rate, and the front-rear driving force distribution ratio in the vehicle 1 including the vehicle control apparatus according to the first example embodiment.

In FIG. 4, the horizontal axis indicates time, and the vertical axis indicates the steering angle (larger on the upper side), the driving force distribution (front-wheel biased on the upper side), and the yaw rate (larger on the upper side).

In the example illustrated in FIG. 4, the steering angle may first increase at a predetermined steering speed on the basis of the automated driving, and may thereafter be kept at a predetermined steering angle.

This steering gives a slip angle to the front wheels to generate cornering force, which causes the vehicle 1 to start turning to generate a yaw rate.

FIG. 4 illustrates a state in which, thereafter, an override steering operation has been performed by the driver in a direction of increasing the steering angle (additional steering). The predicted yaw rate may thus increase and diverge finally. This indicates that the vehicle 1 is likely to fall into a spin mode.

Hence, in the case illustrated in FIG. 4, the oversteer suppression control may be caused to intervene, and the front-rear driving force distribution may be made front-wheel biased as compared with the normal time. This strengthens the understeer tendency of the vehicle 1 to cause the actual yaw rate to converge, thereby stabilizing the vehicle behavior.

Figure 5:
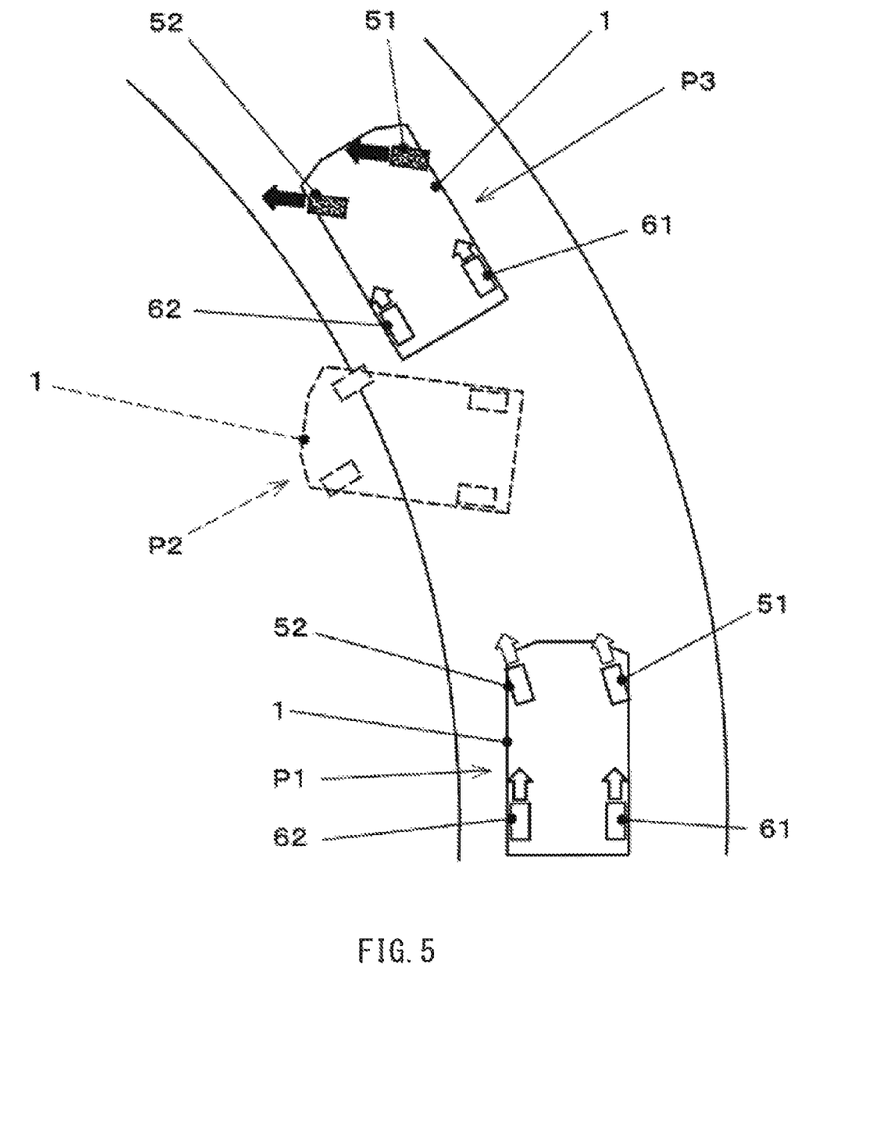
FIG. 5 is a diagram schematically illustrating a state after an override steering operation has been performed in the vehicle including the vehicle control apparatus according to one example embodiment.

FIG. 5 schematically illustrates a state after an override steering operation has been performed in the vehicle 1 including the vehicle control apparatus according to the first example embodiment.

FIG. 5 illustrates a state in which the vehicle 1 enters a left-hand corner (curved road) on the basis of the automated driving (automatic steering), and thereafter an override steering operation is performed by the driver.

In FIG. 5, a length of an arrow in front of each wheel indicates a magnitude of driving force. The same applies to FIG. 6 to FIG. 8 to be described later.

While the vehicle 1 is traveling at position P1 on the basis of the automatic steering (e.g., steady circular turning), if the operation performed by the driver causes the steering angle to increase, excessive yaw moment can be generated to cause the yaw rate to suddenly increase.

If such an increase in the yaw rate is left unaddressed, the oversteer behavior can occur in the vehicle 1. In an extreme case, the vehicle 1 can fall into the spin mode as with a state at position P2.

Hence, in a case where the predicted yaw rate immediately after the override becomes equal to or greater than the oversteer suppression control intervention threshold, the driving force distribution may be changed to front-wheel biased as compared with the normal time to suppress an oversteer tendency of the vehicle 1.

In a state illustrated at position P3, the driving force distribution may be changed to be front-wheel biased, as compared with the normal time (a state of the driving force indicated by the length of the arrow at position P1).

Such change of the driving force distribution causes basic characteristics of the vehicle 1 to exhibit the understeer tendency and suppresses generation of the yaw rate. This stabilizes the behavior of the vehicle 1 and prevents transition to the spin mode.

Figure 6:
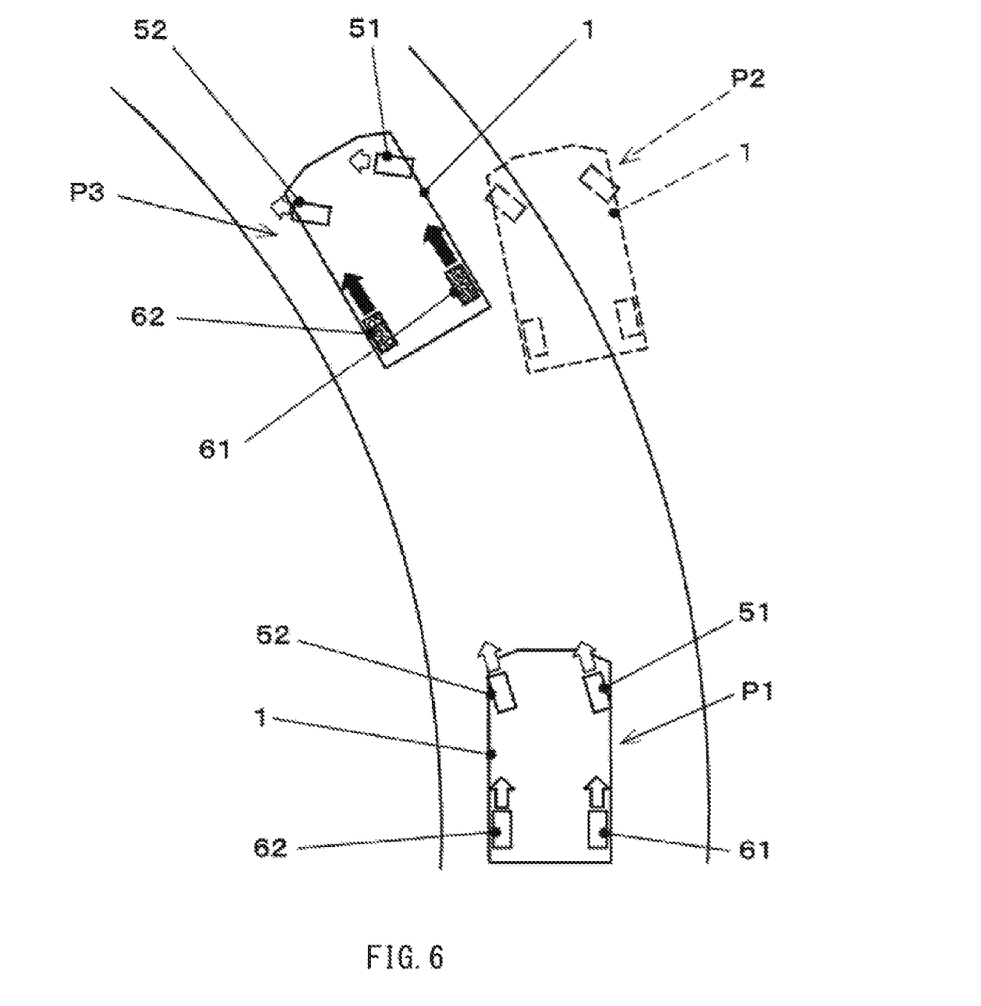
FIG. 6 is a diagram schematically illustrating another state after an override steering operation has been performed in the vehicle including the vehicle control apparatus according to one example embodiment.

FIG. 6 schematically illustrates another state after an override steering operation has been performed in the vehicle 1 including the vehicle control apparatus according to the first example embodiment.

In a case where the driver performs an additional steering operation in a state in which tire force of the front wheels is relatively close to a friction circle limit, drift of the front wheels to the outside in turning (drift-out) can occur even though the steering angle is increased, and the excessively large slip angle can cause the cornering force of the wheels to decrease. This can result in a decrease in yaw moment and occurrence of the understeer behavior (position P2).

Hence, in a case where the predicted yaw rate immediately after the override becomes equal to or less than the understeer suppression control intervention threshold, the driving force distribution may be changed to rear-wheel biased as compared with the normal time to suppress an understeer tendency of the vehicle 1.

In a state illustrated at position P3, the driving force distribution may be changed to be rear-wheel biased, as compared with the normal time (a state indicated at position P1).

Such change of the driving force distribution causes the basic characteristics of the vehicle 1 to exhibit the oversteer tendency and promotes generation of the yaw rate. This stabilizes the behavior of the vehicle 1 and improves line traceability.

According to the first example embodiment as described above, it is possible to achieve at least the following example effects.

(1) In a case where the driver inputs an override steering operation during automatic steering control, and the oversteer behavior of a predetermined magnitude or more due to the steering operation is predicted to occur, the distribution ratio of the driving force between the front wheels and the rear wheels is changed to be front-wheel biased, as compared with a case where the oversteer behavior of a predetermined magnitude or more is not predicted to occur. This makes it possible to strengthen the understeer tendency resulting from the driving force, and prevent the vehicle 1 from becoming unstable due to occurrence of the oversteer behavior.

Moreover, the front wheels may be steered in response to the steering operation performed by the driver in this case. This prevents the driver from feeling discomfort caused by steering not being performed in response to the steering operation.

(2) In a case where the driver inputs an override steering operation during automatic steering control, and the understeer behavior of a predetermined magnitude or more due to the steering operation is predicted to occur, the distribution ratio of the driving force between the front wheels and the rear wheels is changed to be rear-wheel biased, as compared with a case where the understeer behavior of a predetermined magnitude or more is not predicted to occur. This makes it possible to strengthen the oversteer tendency resulting from the driving force, and prevent the vehicle 1 from becoming unstable due to occurrence of the understeer behavior.

Moreover, the front wheels may be steered in response to the steering operation performed by the driver in this case. This prevents the driver from feeling discomfort caused by steering not being performed in response to the steering operation.

Second Example Embodiment

Now, description will be given on a vehicle control apparatus according to a second example embodiment of the technology.

In the example embodiments described below, portions similar to those in the foregoing example embodiments may be denoted with the same reference numerals to omit description, and differences will mainly be described.

In the vehicle control apparatus according to the second example embodiment, in the oversteer suppression control (step S05) and the understeer suppression control (step S09) described above, driving force distribution between turning inner wheels and turning outer wheels may be changed, in addition to the change of the front-rear driving force distribution as with the first example embodiment.

Figure 7:
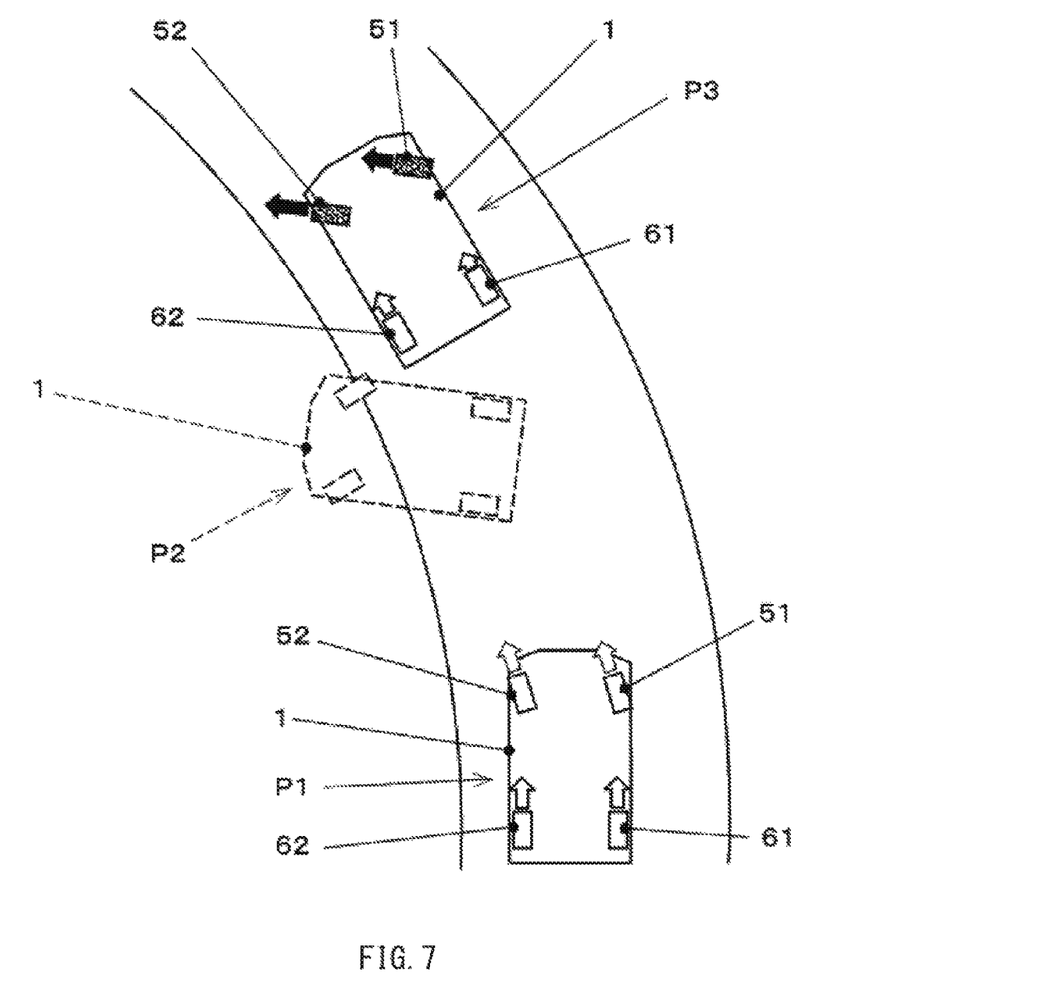
FIG. 7 is a diagram schematically illustrating a state after an override steering operation has been performed in a vehicle including a vehicle control apparatus according to one example embodiment of the technology.

FIG. 7 is a diagram schematically illustrating a state after an override steering operation has been performed in the vehicle 1 including the vehicle control apparatus according to the second example embodiment.

In a state illustrated at position P3 of FIG. 7, in response to prediction of the oversteer behavior, left-right driving force distribution may be made turning-inner-wheel biased as compared with the normal time, in addition to the change of the front-rear driving force distribution to front-wheel biased as with the first example embodiment. This may be achieved by making the driving force of the left front wheel 52 relatively larger than that of the right front wheel 51, and making the driving force of the left rear wheel 62 relatively larger than that of the right rear wheel 61, as compared with the normal time. The left front wheel 52 and the left rear wheel 62 may serve as the turning inner wheels.

Such change of the left-right driving force distribution may be performed by, for example, causing the hydraulic control unit 73 to generate braking force for the brake FR 74 and the brake RR 76 for the turning outer wheels, in a state in which driving force is given to each wheel (accelerator-on state).

For example, in the vehicle 1 that is not performing torque vectoring control for the left front wheel 52 and the right front wheel 51 and torque vectoring control for the left rear wheel 62 and the right rear wheel 61 in the normal time (the vehicle 1 in which the left-right driving force distribution is uniform), control may be performed to give braking force to the front wheel and the rear wheel of the turning outer wheels, making the driving force for the turning inner wheels larger than the driving force for the turning outer wheels.

In a case of the vehicle 1 that is performing the torque vectoring control of giving a driving force difference to the left rear wheel 62 and the right rear wheel 61 and the torque vectoring control of giving a driving force difference to the left rear wheel 62 and the right rear wheel 61 in the normal time, control may be performed to make the driving force for the turning inner wheels relatively large with respect to the driving force for the turning outer wheels, as compared with the torque vectoring control in the normal time.

For example, the driving force of each wheel may be set to be in descending order of the inner front wheel (the left front wheel 52), the outer front wheel (the right front wheel 51), the inner rear wheel (the left rear wheel 62), and the outer rear wheel (the right rear wheel 61).

In one embodiment, the hydraulic control unit 73 may serve as a "left-right driving force distribution unit".

Figure 8:
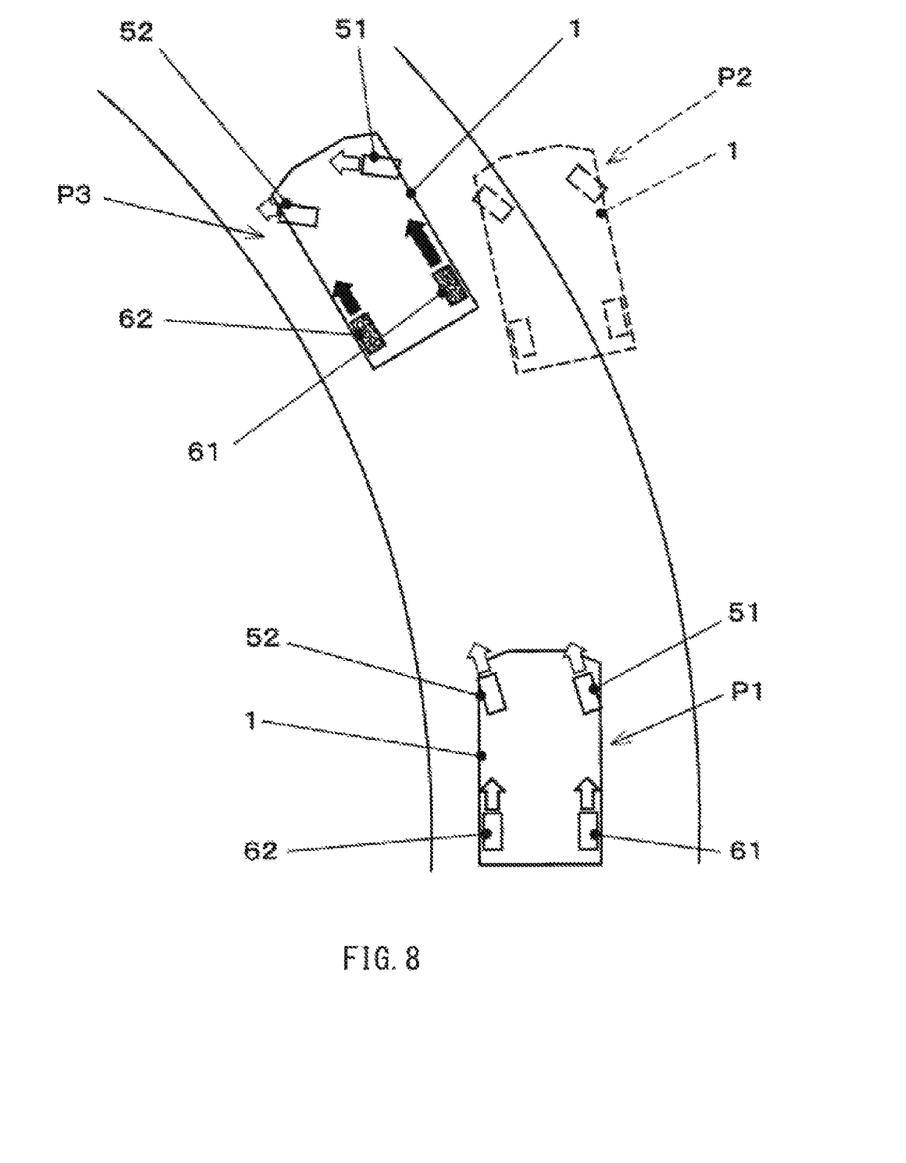
FIG. 8 is a diagram schematically illustrating another state after an override steering operation has been performed in the vehicle including the vehicle control apparatus according to one example embodiment.

FIG. 8 is a diagram schematically illustrating another state after an override steering operation has been performed in the vehicle 1 including the vehicle control apparatus according to the second example embodiment.

In a state illustrated at position P3 of FIG. 8, in response to prediction of the understeer behavior, left-right driving force distribution may be made turning-outer-wheel biased as compared with the normal time, in addition to the change of the front-rear driving force distribution to rear-wheel biased as with the first example embodiment. This may be achieved by making the driving force of the right front wheel 51 relatively larger than that of the left front wheel 52, and making the driving force of the right rear wheel 61 relatively larger than that of the left rear wheel 62, as compared with the normal time. The right front wheel 51 and the right rear wheel 61 may serve as the turning outer wheels.

Such change of the left-right driving force distribution may be performed by, for example, causing the hydraulic control unit 73 to generate braking force for the brake FL 75 and the brake RL 77 for the turning inner wheels, in a state in which driving force is given to each wheel (accelerator-on state).

For example, in the vehicle 1 that is not performing torque vectoring control for the left front wheel 52 and the right front wheel 51 and torque vectoring control for the left rear wheel 62 and the right rear wheel 61 in the normal time (the vehicle 1 in which the left-right driving force distribution is uniform), control may be performed to give braking force to the front wheel and the rear wheel of the turning inner wheels, making the driving force for the turning outer wheels larger than the driving force for the turning inner wheels.

In a case of the vehicle 1 that is performing the torque vectoring control of giving a driving force difference to the left rear wheel 62 and the right rear wheel 61 and the torque vectoring control of giving a driving force difference to the left rear wheel 62 and the right rear wheel 61 in the normal time, control may be performed to make the driving force for the turning outer wheels relatively large with respect to the driving force for the turning inner wheels, as compared with the torque vectoring control in the normal time.

For example, the driving force of each wheel may be set to be in descending order of the outer rear wheel (the right rear wheel 61), the inner rear wheel (the left rear wheel 62), the outer front wheel (the right front wheel 51), and the inner front wheel (the left front wheel 52).

According to the second example embodiment described above, it is possible to achieve at least the following example effects, in addition to example effects similar to the example effects of the first example embodiment described above.

(1) In a case where the driver inputs an override steering operation during automatic steering control, and the oversteer behavior due to the steering operation is predicted to occur, a distribution ratio of the driving force between the turning inner wheels and the turning outer wheels is changed to be turning-inner-wheel biased as compared with the normal time, to generate yaw moment in a direction of suppressing the oversteer tendency. This makes it possible to further prevent the vehicle 1 from becoming unstable due to occurrence of the oversteer behavior.

(2) In a case where the driver inputs an override steering operation during automatic steering control, and the understeer behavior due to the steering operation is predicted to occur, a distribution ratio of the driving force between the turning inner wheels and the turning outer wheels is changed to be turning-outer-wheel biased as compared with the normal time, to generate yaw moment in a direction of suppressing the understeer tendency. This makes it possible to further prevent the vehicle 1 from becoming unstable due to occurrence of the understeer behavior.

Moreover, the front wheels may be steered in response to the steering operation performed by the driver in this case. This prevents the driver from feeling discomfort caused by steering not being performed in response to the steering operation.

MODIFICATION EXAMPLES

The technology is by no means limited to the example embodiments described above. It should be appreciated that modifications and alterations may be made, and the technology is intended to include such modifications and alterations in so far as they fall within the scope of the appended claims or the equivalents thereof.

(1) The configurations of the vehicle 1 and the vehicle control apparatus may be changed as appropriate, without being limited to the example embodiments described above.

For example, in the example embodiments, the front-rear driving force distribution of the vehicle 1 may be performed by the center differential 41 and the transfer clutch 42 provided for the center differential 41. The center differential 41 may include a front-rear asymmetric torque distribution mechanism including planetary gears. However, the front-rear driving force distribution of the vehicle 1 may be performed by another technique.

For example, either of drive mechanisms for the front wheels and the rear wheels may be directly coupled to the output of the speed change mechanism, and a clutch mechanism whose engagement force is variable may be provided between the output of the speed change mechanism and the other drive mechanism.

The front wheels and the rear wheels may be driven by independent power sources. For example, either of the front wheels and the rear wheels may be driven by an engine, and the other may be driven by an electric motor. In another example, the front wheels and the rear wheels may be driven by independent electric motors, or all the wheels may be driven by independent electric motors.

(2) In the second example embodiment, the driving force difference may be given by giving braking force to either of the turning inner wheels and the turning outer wheels. However, a technique of generating the driving force difference between the turning inner wheels and the turning outer wheels is not limited thereto.

An example configuration may include a speed increasing mechanism that increase a speed of either of the left wheels and the right wheels with respect to a speed of the other.

The left wheels and the right wheels may be driven by independent electric motors.

In the second example embodiment, the driving force difference between the turning inner wheels and the turning outer wheels may be generated for both the front wheels and the rear wheels. However, the driving force difference may be generated for only either of the front wheels and the rear wheels.

In the second example embodiment, the driving force difference between the turning inner wheels and the turning outer wheels may be generated in addition to the change of the driving force distribution between the front and rear wheels. However, only the driving force distribution between the turning inner wheels and the turning outer wheels may be changed, without changing the driving force distribution between the front and rear wheels. In this case, the vehicle 1 may be driven by front-wheel drive (FWD) or rear-wheel drive (RWD), without being limited to all-wheel drive (AWD).

(3) In the example embodiments, the state during the automated driving control that causes the vehicle 1 to automatically and autonomously travel has been described as an example. Without being limited thereto, any embodiment of the technology may also be applied to driver assistance control such as lane keeping assistance control or lane departure prevention control.

(4) In the example embodiments, the steering device may have, for example, a steer-by-wire configuration in which the steering wheel 210 and a steering mechanism are not mechanically coupled to each other. Without being limited thereto, any embodiment of the technology may also be applied to an electric power steering device in which the steering wheel 210 and the steering mechanism are mechanically coupled to each other and an electric motor that generates assist force (steering force) is additionally provided.

(5) In a case where an override steering operation is inputted while the automatic steering is ongoing under the automated driving control, for example, and the behavior of the vehicle 1 is predicted to become unstable, an actual amount of steering (amount of turning) with respect to an amount of the steering operation may be suppressed, in addition to the above-described change of the driving force distribution. Suppressing the actual amount of steering may correspond to making the steering gear ratio large (slow).

As described above, at least one embodiment of the technology makes it possible to provide a vehicle control apparatus that makes it possible to stabilize a vehicle behavior exhibited when a driver performs an override steering operation during automatic steering control, and reduce discomfort to be felt by the driver.

Each of the steering control unit 130 and the automated driving control unit 150 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the steering control unit 130 and the automated driving control unit 150. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the steering control unit 130 and the automated driving control unit 150 illustrated in FIG. 1.

The invention claimed is:

1. A vehicle control apparatus comprising:
    a steering device including an actuator and configured to steer front wheels of a vehicle;
    a steering controller configured to control the steering device and cause the vehicle to perform steering automatically, on a basis of a target travel path of the vehicle;
    a steering input member configured to receive a steering operation inputted by a driver;
    a front-rear driving force distribution unit configured to change a front-rear driving force distribution ratio that is a distribution ratio between driving force to be transmitted to a road surface from the front wheels of the vehicle and driving force to be transmitted to the road surface from rear wheels of the vehicle; and
    a behavior controller configured to predict, in a case where a steering operation is performed via the steering input member while the steering controller is causing the steering to be performed automatically, a behavior of the vehicle to be exhibited after steering corresponding to the steering operation, and to cause, in a case where an oversteer behavior of a predetermined magnitude or more is predicted to occur, the front-rear driving force distribution unit to change the front-rear driving force distribution ratio to a front-wheel biased distribution ratio as compared with a case where the oversteer behavior is not predicted to occur.

2. The vehicle control apparatus according to claim 1, further comprising
    a left-right driving force distribution unit configured to change a left-right driving force distribution ratio that is a distribution ratio between driving force to be transmitted to the road surface from a left front wheel of the front wheels and driving force to be transmitted to the road surface from a right front wheel of the front wheels or a distribution ratio between driving force to be transmitted to the road surface from a left rear wheel of the rear wheels and driving force to be transmitted to the road surface from a right rear wheel of the rear wheels, wherein the behavior controller is configured to cause, in the case where the oversteer behavior is predicted to occur, the left-right driving force distribution unit to change the left-right driving force distribution ratio to a turning-inner-wheel biased distribution ratio as compared with the case where the oversteer behavior is not predicted to occur.

3. A vehicle control apparatus comprising:
a steering device including an actuator and configured to steer front wheels of a vehicle;
a steering controller configured to control the steering device and cause the steering device to perform steering automatically, on a basis of a target travel path of the vehicle;
a steering input member configured to receive a steering operation inputted by a driver;
a left-right driving force distribution unit configured to change a left-right driving force distribution ratio that is a distribution ratio between driving force to be transmitted to a road surface from a left front wheel of the front wheels of the vehicle and driving force to be transmitted to the road surface from a right front wheel of the front wheels of the vehicle or a distribution ratio between driving force to be transmitted to the road surface from a left rear wheel of the vehicle and driving force to be transmitted to the road surface from a right rear wheel of the vehicle; and
a behavior controller configured to predict, in a case where a steering operation is performed via the steering input member while the steering controller is causing the steering to be performed automatically, a behavior of the vehicle to be exhibited after steering corresponding to the steering operation, and to cause, in a case where an oversteer behavior of a predetermined magnitude or more is predicted to occur, the left-right driving force distribution unit to change the left-right driving force distribution ratio to a turning-inner-wheel biased distribution ratio as compared with a case where the oversteer behavior is not predicted to occur.

4. A vehicle control apparatus comprising:
a steering device including an actuator and configured to steer front wheels of a vehicle;
a steering controller configured to control the steering device and cause the steering device to perform steering automatically, on a basis of a target travel path of the vehicle;
a steering input member configured to receive a steering operation inputted by a driver;
a front-rear driving force distribution unit configured to change a front-rear driving force distribution ratio that is a distribution ratio between driving force to be transmitted to a road surface from the front wheels of the vehicle and driving force to be transmitted to the road surface from rear wheels of the vehicle; and
a behavior controller configured to predict, in a case where a steering operation is performed via the steering input member while the steering controller is causing the steering to be performed automatically, a behavior of the vehicle to be exhibited after steering corresponding to the steering operation, and to cause, in a case where an understeer behavior of a predetermined magnitude or more is predicted to occur, the front-rear driving force distribution unit to change the front-rear driving force distribution ratio to a rear-wheel biased distribution ratio as compared with a case where the understeer behavior is not predicted to occur.

5. The vehicle control apparatus according to claim 4, further comprising
a left-right driving force distribution unit configured to change a left-right driving force distribution ratio that is a distribution ratio between driving force to be transmitted to the road surface from a left front wheel of the front wheels and driving force to be transmitted to the road surface from a right front wheel of the front wheels or a distribution ratio between driving force to be transmitted to the road surface from a left rear wheel of the rear wheels and driving force to be transmitted to the road surface from a right rear wheel of the rear wheels, wherein the behavior controller is configured to cause, in the case where the understeer behavior is predicted to occur, the left-right driving force distribution unit to change the left-right driving force distribution ratio to a turning-outer-wheel biased distribution ratio as compared with the case where the understeer behavior is not predicted to occur.

6. A vehicle control apparatus comprising:
a steering device including an actuator and configured to steer front wheels of a vehicle;
a steering controller configured to control the steering device and cause the steering device to perform steering automatically, on a basis of a target travel path of the vehicle;
a steering input member configured to receive a steering operation inputted by a driver;
a left-right driving force distribution unit configured to change a left-right driving force distribution ratio that is a distribution ratio between driving force to be transmitted to a road surface from a left front wheel of the front wheels of the vehicle and driving force to be transmitted to the road surface from a right front wheel of the front wheels of the vehicle or a distribution ratio between driving force to be transmitted to the road surface from a left rear wheel of the vehicle and driving force to be transmitted to the road surface from a right rear wheel of the vehicle; and
a behavior controller configured to predict, in a case where a steering operation is performed via the steering input member while the steering controller is causing the steering to be performed automatically, a behavior of the vehicle to be exhibited after steering corresponding to the steering operation, and to cause, in a case where an understeer behavior of a predetermined magnitude or more is predicted to occur, the left-right driving force distribution unit to change the left-right driving force distribution ratio to a turning-outer-wheel biased distribution ratio as compared with a case where the understeer behavior is not predicted to occur.

* * * * *